US005864480A

United States Patent [19]

Ladd

[11] Patent Number: 5,864,480

[45] Date of Patent: Jan. 26, 1999

[54] COMPUTER-IMPLEMENTED ELECTRONIC PRODUCT DEVELOPMENT

[75] Inventor: Patrick Ladd, San Marcos, Calif.

[73] Assignee: NCR Corporation, Dayton, Ohio

[21] Appl. No.: 516,264

[22] Filed: Aug. 17, 1995

[51] Int. Cl.$^{6}$ .............................. G06F 19/00; G06F 17/00

[52] U.S. Cl. ............... 364/188; 364/468.04; 364/468.09; 364/468.15

[58] Field of Search .............................. 364/188, 468.15, 364/468.02–468.04, 468.09, 552; 395/209; 705/10

[56] References Cited

U.S. PATENT DOCUMENTS

| | | | |
|---|---|---|---|
| 5,208,765 | 5/1993 | Turnbull | 364/552 |
| 5,384,910 | 1/1995 | Torres | 395/156 |
| 5,600,775 | 2/1997 | King et al. | 395/806 |
| 5,600,789 | 2/1997 | Parker et al. | 395/183.14 |
| 5,630,125 | 5/1997 | Zellweger | 395/614 |
| 5,655,086 | 8/1997 | Jury et al. | 395/209 |
| 5,657,461 | 8/1997 | Harkins et al. | 395/333 |
| 5,659,793 | 8/1997 | Escobar et al. | 395/807 |

*Primary Examiner*—Paul P. Gordon
*Attorney, Agent, or Firm*—Gates & Cooper

[57] ABSTRACT

A computer-implemented "Product Control Center" (PCC) assists a user through the process of developing a product or documentation. The PCC typically operates on a computer having a monitor and a memory for storing electronic records related to the organization of products. Each product is associated with a process which is defined in terms of a life-cycle, which is divided into one or more phases, each phase is divided into one or more deliverables, and each deliverable can be a milestone. The records for the product, process, phases, deliverables, and milestones. Linkages are provided to word processing and code editing and compiling. The PCC includes a graphical user interface that controls the interactions between the computer-implemented PCC and the user, so that users can configure products by adding, modifying, and deleting the product, phase, deliverables, and milestones records. The PCC permits for the single control of a product development from specifying the process conception, design, implementation, release and support.

12 Claims, 4 Drawing Sheets

COMPUTER-IMPLEMENTED ELECTRONIC PRODUCT DEVELOPMENT

BACKGROUND OF THE INVENTION

1. Field of the Invention

The present invention generally relates to a computer-implemented product development system.

2. Description of Related Art

Efficient development of products is an increasing problem as products need to be developed quickly in a highly competitive environment. Development of a product normally goes through different phases, including conception, feasibility studies, prototyping, mass production and product support aspects. As each phase proceeds, it is normal to verify and confirm the viability of proceeding with a product development. Also, documentation has to be developed to support the different phases. Normally, deliverables are created and activities performed in each phase.

In the Applicant's experience, there does not exist, a system for creating process definitions and corresponding product descriptions, and then monitoring, regulating and centralizing product development in a manner to enhance the efficiency and flexibility of product development and different decisions that need to be made during the product development.

There is a need to provide a process for controlling product development in the different phases of the design, development and delivery of a product and its supporting documentation.

SUMMARY OF THE INVENTION

To overcome the limitations in the known systems described above, and to overcome other limitations that will become apparent upon reading and understanding the present specification, the present invention discloses a computer-implemented electronic product development system. This is a Product Control Center ("PCC") that assists a user through the process of developing a product.

According to the invention, there is provided a computer-implemented electronic product development system, comprising a computer with a monitor coupled thereto. There is a memory, coupled to the computer, for storing an electronic representation of a product and process steps representing different phases in the process for the development of the product.

Each product is described in terms of a pre-defined process. The process breaks down product description into: life-cycle tree, then phase realization trees, then deliverables. Each deliverable has a set of activities that are required to accomplish it. The top of each realization tree is a decision point, and each deliverable can be a milestone.

Each phase includes one or more deliverables, activities, milestones, and a decision point. The milestones are selected for key aspects of the phase.

Each phase realization tree also includes product forms from the process for documenting work in progress on the product in the selected phase using the template.

There is product manager means, performed by the computer and displayed on the monitor, for managing interactions between the computer and a user thereby allowing the user to control product development.

A feature of the present invention is a computer-implemented system that enables a user to have immediate access to the integrated information, guidance, advice, assistance, and tools required to do a specific task or process in the product development.

A further feature of the present invention is to help the user tailor information to meet product development requirements and to incorporate product development input early and often throughout the product development cycle. A feature of the invention is that users can establish and define the system to model almost any product development and to implement the system to fit any industry market and development environment.

The PCC includes a graphical user interface ("GUI"), which controls the interactions between the computer-implemented PCC and the user. The GUI selectively displays inter-related product, phase, deliverables, and activities records on a monitor, and allows users to configure products by adding, modifying, and deleting the product phases, deliverables, and activities, thereby allowing the user to model any total quality management process.

The system and method of the invention can direct the life cycle of a product development. The definition of a process can be accepted and product evolution based on that process. There is provided a quick and easy manner for accessing the process that is in schedule, activities and deliverables related to the product. The system links tools to allow direct access to a development environment.

The system accepts a definition of a product and generates a life-cycle tree, with associated realization phase trees, based on a process. The realization trees identify milestones, activities, deliverables and schedules as necessary to complete the product development. A configurable set of metrics is provided for different aspects of the product life cycle. All aspects of the development of a product can be controlled by the PCC. Thus, the PCC can control specifying the process, product conception, design, implementation, release and support.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

I. OVERVIEW

Figure 1:
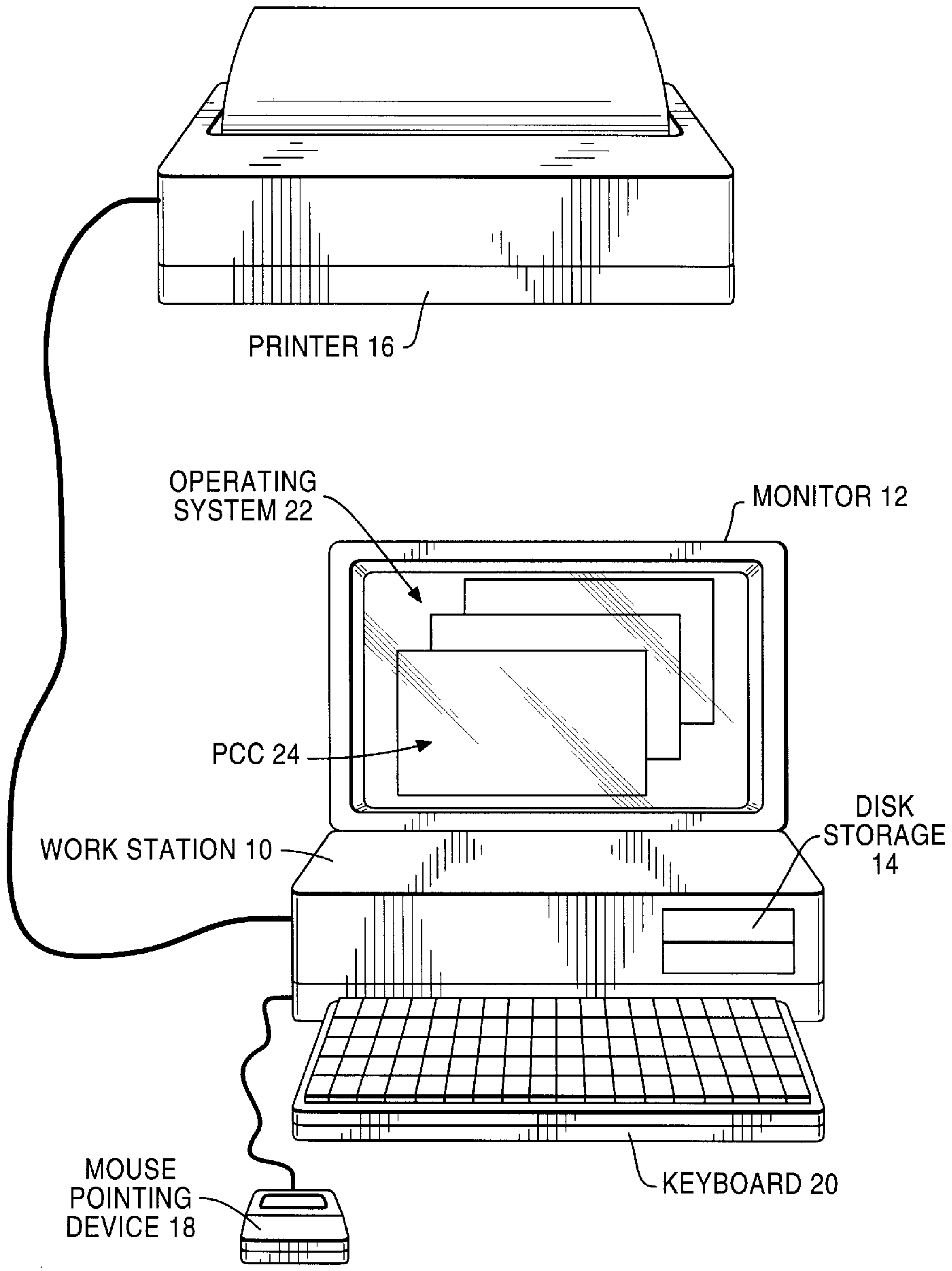
FIG. 1 illustrates one possible embodiment of the present invention.

FIG. 1 illustrates one possible embodiment of the present invention. The present invention comprises a computer-implemented "Product Control Center" (PCC) that assists a user through the process of developing a product and/or documentation. The PCC typically operates on a computer 10 or network of computers 10. It is envisioned that attached to the computer 10 will be monitor 12, disk storage 14, and printer 16 peripherals. Also included in the preferred embodiment are input devices, for example, a mouse pointing device 18 and a keyboard 20. In addition, the computer 10 operates under the control of an operating system 22. The PCC itself is a suite of computer programs 24 and databases or files operating under control of the operating system 22.

The PCC 24 provides a processed approach to the design, development and delivery of products. The PCC 24 is an information technology enabling a user to have immediate access to the integrated information, guidance, advice, assistance, training and tools required to establish and develop a specific product based on a specific process. The PCC 24 provides a model that stresses attention on product development by process adherence and seeks to continuously improve the product development. The PCC is designed to help the user tailor information to meet product development requirements and to incorporate development input early and often throughout the development cycle. The goal is to provide flexible process definition and product development guidance.

The PCC 24 is a flexible tool that can be used to analyze the product development cycle in phases, and to make rational developmental decisions about how to meet the product development needs.

The PCC 24 is modifiable and configurable, thereby allowing the user to model almost any product development process and to implement the PCC 24 to fit their own industry market and product development environment. Users can configure and define the PCC 24 by adding, modifying, or deleting any of the PCC 24 components, i.e, phases, activities, deliverables, milestones, and tools.

Figure 2:
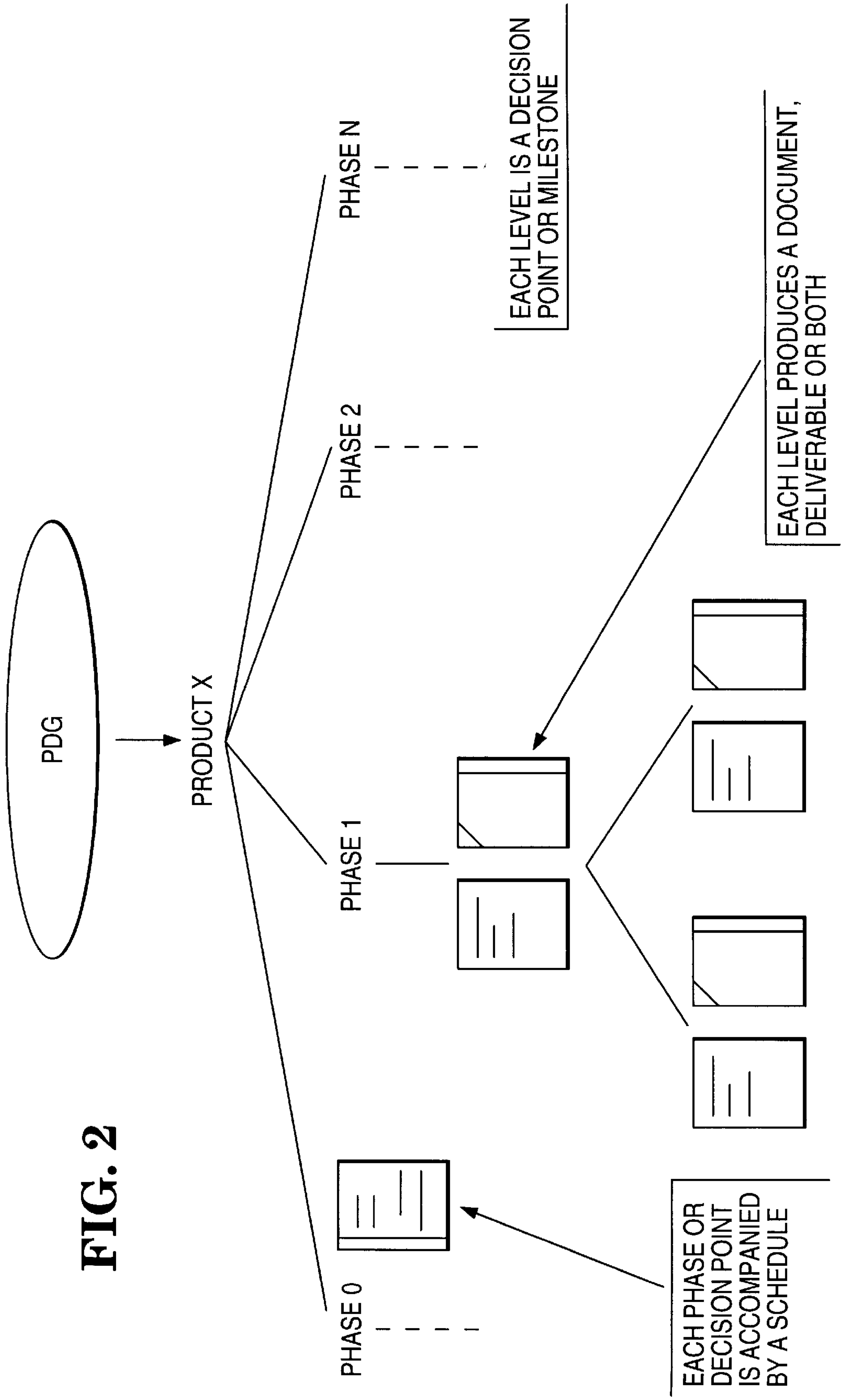
FIG. 2 is a tree description of the organization of projects within the present invention.

FIG. 2 is a tree description of the organization of records representing projects within the memory of the computer performing the PCC 24. Each product in the PCC 24 is specified in terms of a process, which is comprised of a life-cycle tree, which is divided into phases, which are divided into deliverables. Each phase contains one or more milestones, decision points or schedules.

II. PRODUCT CONTROL CENTER DESCRIPTION

The Product Control Center (PCC) is a tool which centralizes the development of a computer, software/hardware, product or products. It begins by accepting a description of the process or processes that will be used to realize the product. There is a requirement upon this description that it be phased; for example, conception phase, design phase, implementation phase, release phase.

Once the process has been described along with all of its associated phases, documents, and deliverables, the desired product or products can be described. When the PCC accepts a product description, it generates a set of process trees associated with it. Each tree is related to a phase. The leaves of a tree represent a document or deliverable, as specified by the process description. Each leaf or branch is a milestone or decision point, too. If there is a decision point, there is an accompanying schedule.

The PCC directs development through the milestones and phases, and can invoke all of the tools necessary, such as word processors, hardware and software design methodology tools, and hardware and software development tools. As well as documents and deliverables, a product may be described in terms of other products, in order to allow complete system description.

The PCC provides a comprehensive set of metrics for monitoring different aspects of the development of a product. Categories monitored include schedule, productivity and quality, hardware and software, budget, and resources.

The PCC functionality includes process definition, product description and metrics. The description includes phased implementation, document formats, deliverable identification, with milestones and decision points, and development tool invocation.

A. PCC Components

The PCC incorporates two major components: the Process Definition Script GUI (PSG), and the Product Description GUI (PDG).

The PSG is used to input a process used for the entire life cycle of particular product. More than one process may be entered for use with multiple products. The PDG is used to input the description of one or more products, generate the process trees, and direct the development, implementation, and release of the products.

B. Process Script GUI (PSG)

The PSG is a GUI-based application that inputs one or more processes into the PCC. A process is described to the PCC using a scripting language files or definition files. The process is specified as a life cycle tree, which is broken down by phases, then the realization trees within the phases, and finally, the activities and/or deliverables that make up the tree nodes (e.g., items at each fork in a tree branch). The top of a tree (root) begins a phase, and a schedule is required to accompany it. Each leaf or branch of the tree is a milestone and can also be a decision point. If the leaf or branch is a decision point, then a schedule is required to accompany it. Splits and levels of the tree indicate concurrent phase activity. For example, software and hardware documentation occurring at the same time.

C. Product Description GUI (PDG)

The PDG accepts the input for one or more products. When a product is specified, the process to be used during the implementation of the product is also specified. The process is defined before the product. When a minimal amount of product information has been entered, the PDG uses the process defined for it as a template and generates the life cycle tree. The life cycle tree, along with its realization phase sub-trees, is used to guide the aspects of product development and maintenance.

Referring to FIG. 2, the name "Product X" is substituted with the name of the actual product. As deliverables are begun, they are linked to the PDG. For example, when a document is started, it is linked to the PDG.

The PDG can open the document in the appropriate word processor simply by double clicking on the document icon. Other tools that the PDG might be linked to include: hardware simulation, software compilers, source control, etc. Single clicking on a deliverable icon displays a summary menu which, among other things, briefly describes it. The PDG enforces completion of deliverables and phases in the order defined in the process. For example, the first thing to be completed at the top of the phase 0 tree is a schedule.

Multiple products may be linked together to form a meta-product. The PCC should allow for the terms "meta-product", "product" and "module" to be redefined per the definition of the user. For example, "Meta Product" could be "Product", "Product" could be "Feature", and "Module" could be component.

For browsing purposes, the PDG contains a menu that displays the products and meta-products entered thus far. If one of these is selected, it explodes into its respective product tree. From here, one of the phase trees may be selected. From a phase tree, a deliverable can be selected by either single clicking (summary), or double clicking (detail). The summary browse gives a brief description of the deliverable, its completion status, and metrics. The detail browse opens the deliverable with whatever tool to which it is linked.

Metrics are maintained automatically. There are default metrics. The metrics, too, are specified by scripts. They can be modified, deleted, or added to by modifying the scripts using the PDG.

III. FUNCTIONAL DESCRIPTION

The Functional Description ("FD") describes how a product is initiated, developed and released using the PCC. The FD provides recommendations for implementation details, which are intended to assist in concept description, but are not actual requirements.

A. Process Definition

Before a Production Definition can be entered into the PCC, a development process is described first. This enforces the usage of one or more processes. The PCC should come with a standard development process that can be used as a default. It may be desirable to include several built-in processes and let the user choose which suits their needs best. For example, a process based on Structured Analysis/Structured Design, as well as a process based on Object Oriented Software Engineering could be included. The Scientific Engineering Institute ("SEI") has widely accepted development processes that are recommended as the default.

The process itself should be described using a scripting language or file format that makes process description straightforward and flexible. How this information is relayed to the PCC could be implemented in a myriad of different ways, such as, command line interface, X-Windows™ GUI, Microsoft Windows™ GUI, or a combination of several, in order to improve portability. The process definition script and accompanying GUI are referred to as the Process Script GUI ("PSG"). Each component or item in the process description should have a specific format that make it unambiguous, a glossary of items that should be included in this description are as follows:

1. Process Identification

The process should be identified with an industry standard or company-given name so that it can be differentiated and selected from other processes. Also, a brief description of the process should be given describing its basic philosophy, useful points, and weak spots. The process specifies different types of modules within a product that it supports. A module is defined as a part of the product that has independent qualities; for example, a software program. For a computer product, a minimum set of module types would include: software (e.g., program, sub-program, etc.), hardware (e.g., board, ASIC, peripherals, cabling, etc.), mechanical (e.g., cabinet, mounting adapters, etc.).

2. Development Phases

These are definitions of the phases that make up complete product development. Examples include: Concept Phase, Design Phase, Implementation Phase, and Release Phase.

A format suggestion would include text description, entry criteria and exit criteria for each phase. The entry and exit criteria should be measurable.

3. Phase Components or Steps

Each Development Phase will have activity and deliverable components. These are defined as either sequential (asynchronous) components that must complete before some other activity can begin, or parallel (synchronous) components, that can proceed concurrently with other components, or both, as is the case with hardware and software design. Although the Process Description will only show a single set of components for tasks such as software development, it is recognized that a product can have many sets of such components. Therefore, the PCC Product Definition will allow for multiple sets of software, hardware or other product-specific development, as needed.

A format suggestion would be to categorize the components and make them quantifiable.

Category examples could be decision points milestones, activities, and deliverables.

4. Decision Points

Each phase, and the product itself, begins with a decision point. Decision points determine whether to go, cancel, or redirect a portion or all of the product. The entry and exit criteria for each phase include a decision point. Decision points are not required for every activity and deliverable, but should be placed in strategic positions so as to reduce risk. A schedule is required to accompany a decision point; however, a single schedule can cover multiple decision points.

5. Milestone

A milestone signals that a significant component in the product has been completed, and the resources on that component can begin the next components, if applicable, or the resources can be directed to another portion of the product or a different product altogether. Milestones signal the start of zero to many components that were dependent upon the completion of the component associated with the milestone. Once product development has begun, milestones can occur at the same time as decision points.

6. Activities

These could include meetings, team creation, requirements acquisition, prototyping, tool, material, and supply purchasing, etc. Start criteria in the form of phase component completion (e.g., decision point, milestone, activity, deliverable) should be specified.

7. Deliverables

These are physical tangibles that are a part of the product release, such as schedules, documents, software and hardware releases. Start criteria in the form of phase component completion (e.g., decision point, milestone activity, deliverable) must be specified.

8. Life Cycle Tree

A life cycle tree, as defined during process definition, is generic and not product specific when a product is described. The life cycle tree contains the product description and links to the phase realization trees for that product. Each realization (phase) tree structure is created from decision point and milestone definitions for that phase. Decision points determine when and if the Product, Phases, and certain activity and deliverable work, begins. Milestones specify the completion of one component and the start of zero to many components that were dependent upon the component associated with the milestone. Using Phase definition, decision points, milestones, and activity and deliverable start criteria, a complete description of each phase's realization tree can be created.

9. Sample Process Creation

An easy way to enter a process into the PCC would be to use a top-down technique. Begin with the big picture and work down to the detailed pieces. Top-down process definition steps would include:

1. Define the process,
2. Define the phases of the process, including entry and exit criteria,
3. Define the decisions points, define the activities, deliverables, and milestones.

Step 3 will be somewhat ad hoc as the components specified in that step may have interdependencies which forego definition in any particular order. The GUI will help here by providing a graphical display of the realization tree as it is being created. Also, all of the items listed in step 3 above could be entered in flow chart form to assist with logic completeness.

An important characteristic is that the phase definitions are complete, comprehensive, and have measurable and deterministic entry and exit points.

10. Product Description

Defining a product to the PCC will be similar to Process Definition for two reasons: (i) the Product Description GUI ("PDG") provides the same look and feel as the PSG, and (ii) a template for product description is provided from a process definition. This should simplify product description as the process definition gives a set of fill-in-the-blanks trees in which all of the necessary deliverables have already been laid out.

To initiate a product definition, the product creation function is selected. After the product name and textual description have been created, a process is selected. This creates a life cycle tree with realization subtrees for the product, including the deliverables, activities, etc., that were defined in the process definition. Next, a customer or marketing Request For Product ("RFP"), or equivalent, is used to create the PCC product definition. This same RFP is studied to derive the initial phase, product-specific components. A specific component derived from the RFP will be the product Business Plan or equivalent. The product-specific components in the rest of the phases can be defined from this document. It is recommended that facilities for tracking requirements throughout the process be given by process designers.

As shown in FIG. 2, each deliverable appears as a specific type of icon in one of the realization tree displays. The type of icon is dependent upon the type of deliverable: schedule, document, software, hardware, or even another product. When the deliverable type is specified, a development environment script is also specified. This script may execute a small set of simple commands, like opening a document in a word processor, or it could execute a set of more complex commands for setting up a software editing and compiling session. In any case, the sequence is totally flexible by use of the script file. To execute this script, the icon in the PDG realization tree is double clicked. Single clicking one of these icons causes it to explode into a summary window that shows the textual and other information entered during product description, and allows any of this information to be modified. This is the technique for browsing and modifying product components. When it is necessary to access one of the documents, double click the appropriate document icon (e.g., feature specification, software design specification, etc.), this brings up a dialog box with choices for the documents, then double click the desired document to open it in the appropriate word processor.

For a single product, multiple modules can be necessary. Such modules may take the form of software programs, hardware boards, chassis cabling, etc. The process includes module category definitions that are usable by the product being defined. If not, a different process should be selected that is more applicable to the product.

Once the process has been chosen, and the general product information entered (e.g., name and textual description), then the modules and their corresponding categories are to be input. With this information, the PCC will locate each module in pertinent icons in the realization phase trees. For example, a software module might appear in the software requirements, specification, feature specification, and design specification icons. All of the software modules appear in software-pertinent icons. Such modules can be viewed, and information about them changed, by single clicking a desired icon, such as the software design specification icon in the design realization phase tree.

The product description activity consists of:

1. Selecting a process for the new product and opening the process trees.
2. Describing the modules.
3. Begin filling in the blanks for the product by single-clicking the product icon, then editing the product name and textual description.
4. Visit each icon by single-clicking and fill in the blanks for fields like textual description, and environment script. If applicable, define multiple modules that branch from this icon for software or hardware development or other product-specific deliverable.

Once the realization trees have been described for a product, the product description can be distributed to the appropriate workgroups. As development progresses and milestones are met, such as the submittal of a document to the repository, the PCC is informed, too. The PCC then indicates this completion by modifying the way the icon looks (perhaps by changing color), and the PCC indicates the next work step to be undertaken.

B. Metrics

The PCC monitors schedule, productivity and quality, hardware and software, budget, and resources metrics. The PCC does not implement any development tools, it merely invokes them. Therefore, in order for the PCC to monitor metrics, it chooses the output file format of specific tools. For example, to create metrics concerning schedules, file formats for one or more schedule programs must be understood and evaluated. Then, the PCC schedule metrics are updated from this evaluation. Specific metric tools may need to be executed from environment scripts for specific module aspects such as software evaluations. The file output created from these evaluations are deciphered and placed into the PCC metrics database. The metrics evaluator that is built into the PCC also allows for manual input of metrics.

1. Metrics Definition

Like the process definitions and product descriptions, the PCC metrics definitions are formatted in a fashion that allows them to be added to or modified easily. The format of this file should:

1. Specify a unique name for each metric;
2. Provide metric categories, such as schedule, productivity, software, etc.
3. Identify tool file fields and expressions used to derive the metric; and
4. Define metric report formats.

Figure 3:
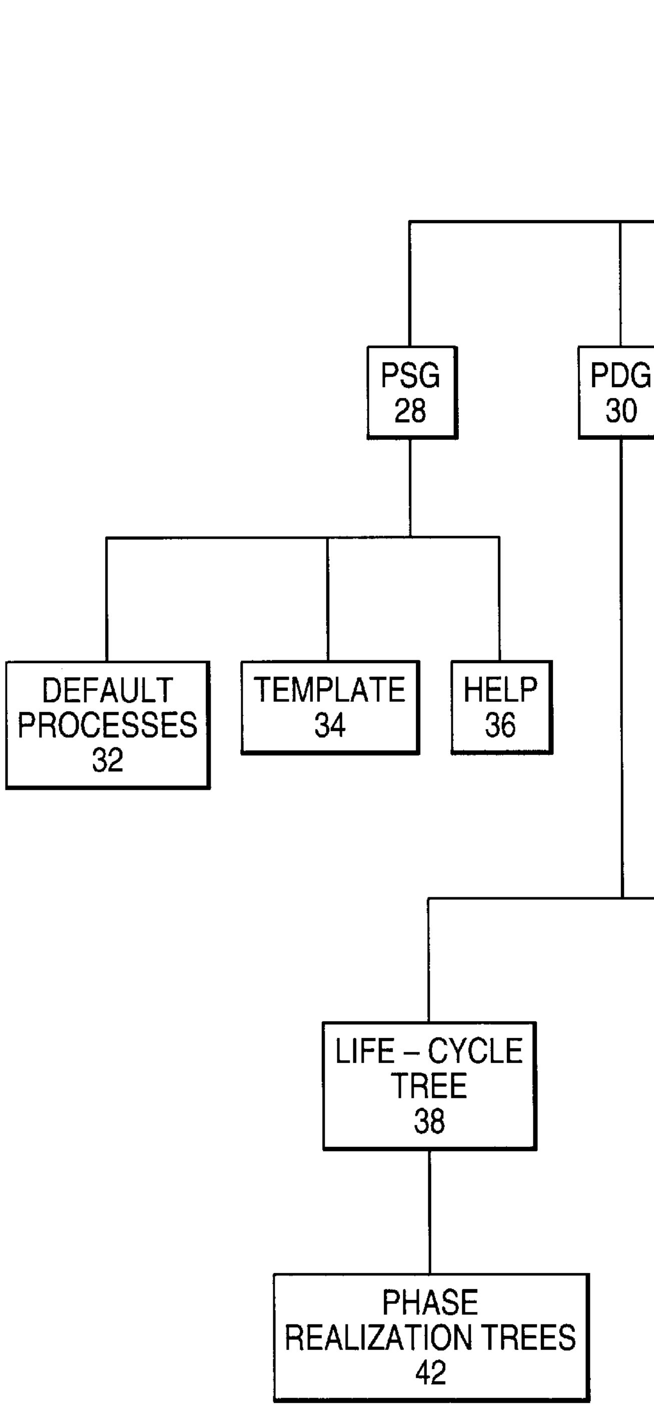
FIG. 3 is a block diagram illustrating the structure of the present invention.

FIG. 3 is a block diagram illustrating the structure of the present invention. The PCC 24 includes several different procedures. In particular, there is a life cycle tree which is a process system GUI 28. This system allows for the defining of the process to be set up for the product control center 24. There is also a PDG 30 from which the life cycle tree 38 is developed. In turn, after development of the life cycle tree 38, there are different phase realization trees 42, through which different phases of the project are developed. Examples of the phases would include conception, design, release, support, etc.

In the PDG 30, there is a Help Directory 40. Within the PSG tree 28, there are programs which cover the default processes 32, a template 34, and a Help Program 36. Also within the PCC 24, there is Product Folder Manager 26 and a Help Program 32.

Within each deliverable, for instance, a document, software module, or hardware component, there can be one or more milestones. A milestone marks a significant accomplishment and helps determine if the product is on schedule. Milestones are not linked together. The deliverables form part of the phase realization trees 42 for each phase. Within each of the deliverables there is an activity that needs to be completed to accomplish the deliverable. For instance, the activity for a deliverable may include the:

(a) filling out of an entry criteria form;

(b) picking up the requirements document template;

(c) a team for editing the document;

(d) a team for evolving sections of a document;

(e) filling out extra criteria forms.

Thus, associated with each mode of a phase realization tree 42 there is a set of activities. This set can be defined as a flow chart. A single clicking of the node icon, namely the browse mode, would explode the node into a summary menu, and allow a user to select an activities flow chart for viewing or editing, as required. A double click on the node icon, namely the execution mode, would, for instance, bring up a document in a word processor, or bring up source code in an editing/compiling source control environment.

Figure 4:
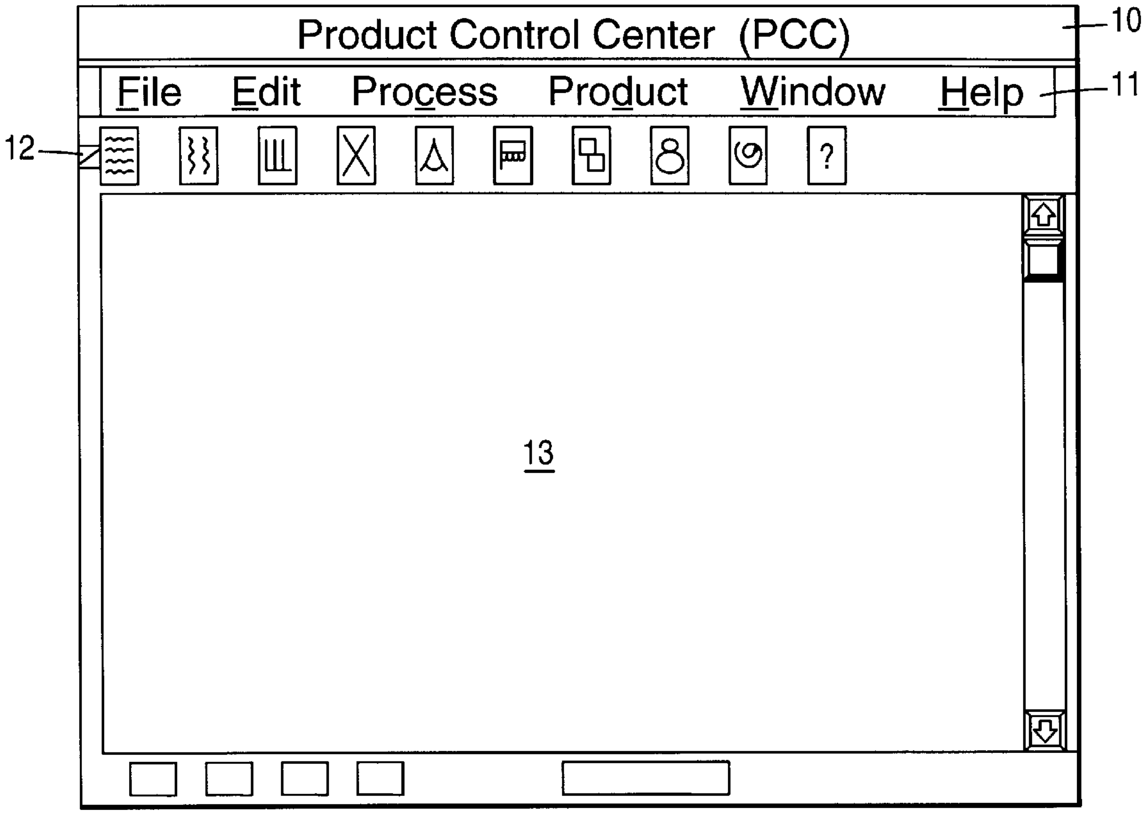
FIG. 4 is an illustration of one embodiment of the present invention relating to the presentation of the graphical user interface of the product control center folder manager.

As illustrated in FIG. 4, there is shown an example window presentation of the computer 10. The product control center includes different elements for the file, edit, process, product, window or help selection in the PCC. These options are displayed on the bar and are a row 12 of smart icons for quick function selection. Below the smart icon bar 12 is a display or work area 13 which would show trees, flow charts, timelines, etc. Both the process and product pull-down menus can have template options, as required.

IV. CONCLUSION

In summary, the present invention discloses a computer-implemented "Product Control Center" (PCC) that assists a user through the process of developing a product or documentation. The PCC typically operates on a computer having a monitor and a memory for storing electronic records related to the organization of process and the product.

Each process is defined in terms of a life-cycle tree which is divided into one or more phases, each phase is divided into one or more deliverables, and each deliverables can be a milestone. The records for the products, phases, deliverables, and milestones include linkages to maintain these relationships.

The PCC includes a graphical user interface (GUI) that manages and controls the interactions between the computer-implemented PCC and the user. The GUI selectively displays inter-related product, process, phase, deliverables, and milestones records on a monitor, and allows users to establish and configure a product or process by adding, modifying, and deleting the process, phase, deliverables, and milestone records, thereby allowing the user to model any product development.

The PCC is a generic control center for product realization. The PCC centralizes and directs the entire life-cycle of a hardware/software computer product. It accepts the definition of a process, and directs the product's evolution based on that process. It provides quick and easy access to a product's process, status and schedules, documents and deliverables. It has links to tools to allow direct access to a development environment; for example, selecting a document from the PCC opens it in the appropriate word processor.

The PCC also accepts the description of a product and generates a life-cycle tree based on a process associated with the product. The life-cycle tree contains realization trees which identify milestones, documents, deliverables, and schedules necessary to complete the product. The PCC maintains a configurable set of metrics for all aspects of the product's life cycle.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented electronic product development system, comprising:

(a) a computer with a monitor coupled thereto;

(b) a memory, coupled to the computer, for storing an electronic representation of a product and process steps representing different phases in the process for the development of the product, wherein the electronic representation of the process comprises a process life-cycle tree that is divided into one or more phase realization subtrees for each of the different phases; each phase realization subtree comprises one or more elements selected from a group comprising a document, a deliverable, a milestone, a decision point, and a schedule, and the decision point comprises a top of the phase realization subtree; and (c) one or more programs, executed by the computer and displayed on the monitor, for managing interactions between a user and the process life-cycle tree and phase realization subtrees, thereby allowing the user to control product development.

2. The system of claim 1 above, wherein each deliverable comprises a set of one or more activities that are required to accomplish the deliverable.

3. The system of claim 2 above, wherein the phase realization subtree includes a plurality of concurrent activities.

4. The system of claim 1 above, wherein the memory stores one or more metrics for monitoring different aspects of the development of the product.

5. A computer-implemented method for electronic product development, comprising the steps of:

(a) storing an electronic representation of a product and process steps representing different phases in the process for the development of the product in a memory coupled to a computer, wherein the electronic representation of the process comprises a process life-cycle tree that is divided into one or more phase realization subtrees for each of the different phases, each phase realization subtree comprises one or more elements selected from a group comprising a document, a deliverable, a milestone, a decision point, and a schedule, and the decision point comprises a top of the phase realization subtree; and (b) managing interactions between a user and the process life-cycle tree and phase realization subtrees using one or more programs executed by the computer and displayed on a monitor attached to the computer, thereby allowing the user to control product development.

6. The method of claim 5 above, wherein each deliverable comprises a set of one or more activities that are required to accomplish the deliverable.

7. The method of claim 6 above, wherein the phase realization subtree includes a plurality of concurrent activities.

8. The method of claim 5 above, further comprising the step of storing one or more metrics in the memory to monitor different aspects of the development of the product.

9. An article of manufacture embodying one or more programs that when executed by a computer causes the computer to perform method steps for electronic product development, the method comprising the steps of:

(a) storing an electronic representation of a product and process steps representing different phases in the process for the development of the product in a memory coupled to the computer, wherein the electronic representation of the process comprises a process life-cycle tree that is divided into one or more phase realization subtrees for each of the different phases, each phase realization subtree comprises one or more elements selected from a group comprising a document, a deliverable, a milestone, a decision point, and a schedule, and the decision point comprises a top of the phase realization subtree; and (b) managing interactions between a user and the process life-cycle tree and phase realization subtrees using a product control center program executed by the computer and displayed on a monitor attached thereto, thereby allowing the user to control product development.

10. The article of manufacture of claim 9 above, wherein each deliverable comprises a set of one or more activities that are required to accomplish the deliverable.

11. The article of manufacture of claim 10 above, wherein the phase realization subtree includes a plurality of concurrent activities.

12. The article of manufacture of claim 9 above, further comprising the step of storing one or more metrics in the memory to monitoring different aspects of the development of the product.

* * * * *